United States Patent
Bhongale et al.

(10) Patent No.: US 10,948,625 B2
(45) Date of Patent: Mar. 16, 2021

(54) SYSTEMS AND METHODS FOR VOLUME CONCENTRATION DETERMINATION WITH DIFFRACTION OF ELECTROMAGNETIC RADIATION

(71) Applicant: Halliburton Energy Services, Inc., Houston, TX (US)

(72) Inventors: Satyan Gopal Bhongale, Cypress, TX (US); Wolfgang Hartmut Nitsche, Humble, TX (US); John Laureto Maida, Houston, TX (US); Michel Joseph LeBlanc, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 26 days.

(21) Appl. No.: 16/328,230

(22) PCT Filed: Sep. 27, 2016

(86) PCT No.: PCT/US2016/053887
§ 371 (c)(1),
(2) Date: Feb. 25, 2019

(87) PCT Pub. No.: WO2018/063144
PCT Pub. Date: Apr. 5, 2018

(65) Prior Publication Data
US 2019/0212468 A1    Jul. 11, 2019

(51) Int. Cl.
*G01V 11/00* (2006.01)
*E21B 49/08* (2006.01)
(Continued)

(52) U.S. Cl.
CPC .......... *G01V 11/00* (2013.01); *E21B 49/081* (2013.01); *E21B 49/088* (2013.01); *G01V 1/40* (2013.01); *G01V 3/30* (2013.01); *E21B 49/0875* (2020.05)

(58) Field of Classification Search
CPC ............... E21B 49/088; E21B 49/081; E21B 2049/085; E21B 49/0875; G01V 1/40; G01V 11/00; G01V 3/30
See application file for complete search history.

(56) References Cited

U.S. PATENT DOCUMENTS

| 4,080,837 A | 3/1978 | Alexander et al. |
| 4,236,406 A | 12/1980 | Reed et al. |

(Continued)

FOREIGN PATENT DOCUMENTS

| WO | 2014204473 A1 | 12/2014 |
| WO | 2018063237 A1 | 4/2018 |

OTHER PUBLICATIONS

International Search Report and Written Opinion dated May 10, 2017, for the PCT application PCT/US2016/053887 filed on Sep. 27, 2016.

*Primary Examiner* — Jay Patidar
(74) *Attorney, Agent, or Firm* — Chamberlain Hrdlicka

(57) ABSTRACT

A system, method, and device for determining volume concentration with diffraction of electromagnetic radiation. A device for determining a volume concentration of a fluid in a sample comprises a transducer, a transmitter, a detector, and a processor. The transducer generates a standing acoustic wave through the sample. The transmitter emits electromagnetic (EM) radiation into the sample such that the EM radiation is diffracted by the sample. The detector is responsive to the diffracted EM radiation and generates a signal indicative of a wavelength of an acoustic wave corresponding to the standing acoustic wave. The processor analyzes the signal to determine the volume concentration of the fluid in the sample.

17 Claims, 5 Drawing Sheets

(51) Int. Cl.
    *G01V 1/40*     (2006.01)
    *G01V 3/30*     (2006.01)

(56) References Cited

U.S. PATENT DOCUMENTS

| | | | |
|---|---|---|---|
| 4,633,714 A * | 1/1987 | Mazumder | G01N 15/0205 |
| | | | 356/336 |
| 5,542,285 A | 8/1996 | Merilainen et al. | |
| 8,879,053 B2 | 11/2014 | Freese et al. | |
| 2007/0035736 A1 | 2/2007 | Vannuffelen et al. | |
| 2008/0212100 A1 | 9/2008 | Pavlovsky | |
| 2016/0084718 A1 * | 3/2016 | Teale | E21B 47/07 |
| | | | 374/161 |

* cited by examiner

SYSTEMS AND METHODS FOR VOLUME CONCENTRATION DETERMINATION WITH DIFFRACTION OF ELECTROMAGNETIC RADIATION

This section is intended to provide relevant contextual information to facilitate a better understanding of the various aspects of the described embodiments. Accordingly, it should be understood that these statements are to be read in this light and not as admissions of prior art.

Many techniques are known for maximizing the volume of hydrocarbons produced by an oil well. Characteristics of different fluids in the well, at different depths, are often measured to determine which depths of the well are producing oil, and the rate at which they are producing. Typically, perforations are made in the well casing at different depths to permit oil to flow into the well-bore from the surrounding strata. Although it is advantageous to create these perforations at depths corresponding to oil-bearing strata, these perforations are sometimes made at depths where a mixture of oil and water is located, or where water exists alone. In some cases, perforations are made at depths that initially produce a great deal of oil but, eventually produce more and more water and less and less oil, due to depletion of the reserves at that depth. If it is determined that a certain depth of the well is non-producing, or is producing mostly water, such as brine, some remedial work is performed upon that depth of the well. For example, the perforations in the casing at that depth may be plugged to stop production. Then, other more productive depths of the well may continue producing. Moreover, new production may be initiated by perforating the casing at other, untapped depths of the well. Therefore, an important function of production logging is to measure the ratio of water to oil at different depths inside the wellbore.

One such measure is water cut, which is defined as the volume of water produced compared to the volume of total fluids produced in a well over a given time period and expressed as a percentage of the total volume of fluid produced in that time period. A number of different devices are used to measure water cut, such as a capacitance probe, a gamma ray densitometer, and a gradiomanometer, but each has inherent drawbacks.

BRIEF DESCRIPTION OF THE DRAWINGS

For a detailed description of the embodiments, reference will now be made to the accompanying drawings in which.

DETAILED DESCRIPTION

This disclosure provides determination of a volume concentration of constituents in a sample. Specifically, the disclosure provides a device, system, and method for determining the volume concentration of a fluid in the sample by measuring the diffraction of electromagnetic (EM) radiation through the sample. For example, the water cut can be determined by diffracting electromagnetic radiation in a sample with a standing acoustic wave propagating through the sample. Electromagnetic radiation is strongly absorbed by water as compared to other fluids produced from the well. Generation of sound waves in fluids allows for regions of contrasting densities between the nodes and anti-nodes of the standing wave, which provides enhanced sensitivity to the absorption of electromagnetic radiation in the sample, and therefore, providing a highly sensitive measurement of the velocity of sound in the sample. The velocity of sound in the sample can be used to determine the concentrations of constituents in the sample, e.g., the concentration of water. Thus, this disclosure offers a device, system, and method to determine the volume concentration of a fluid in a sample by measuring the diffraction of electromagnetic radiation in the sample.

Figure 1:
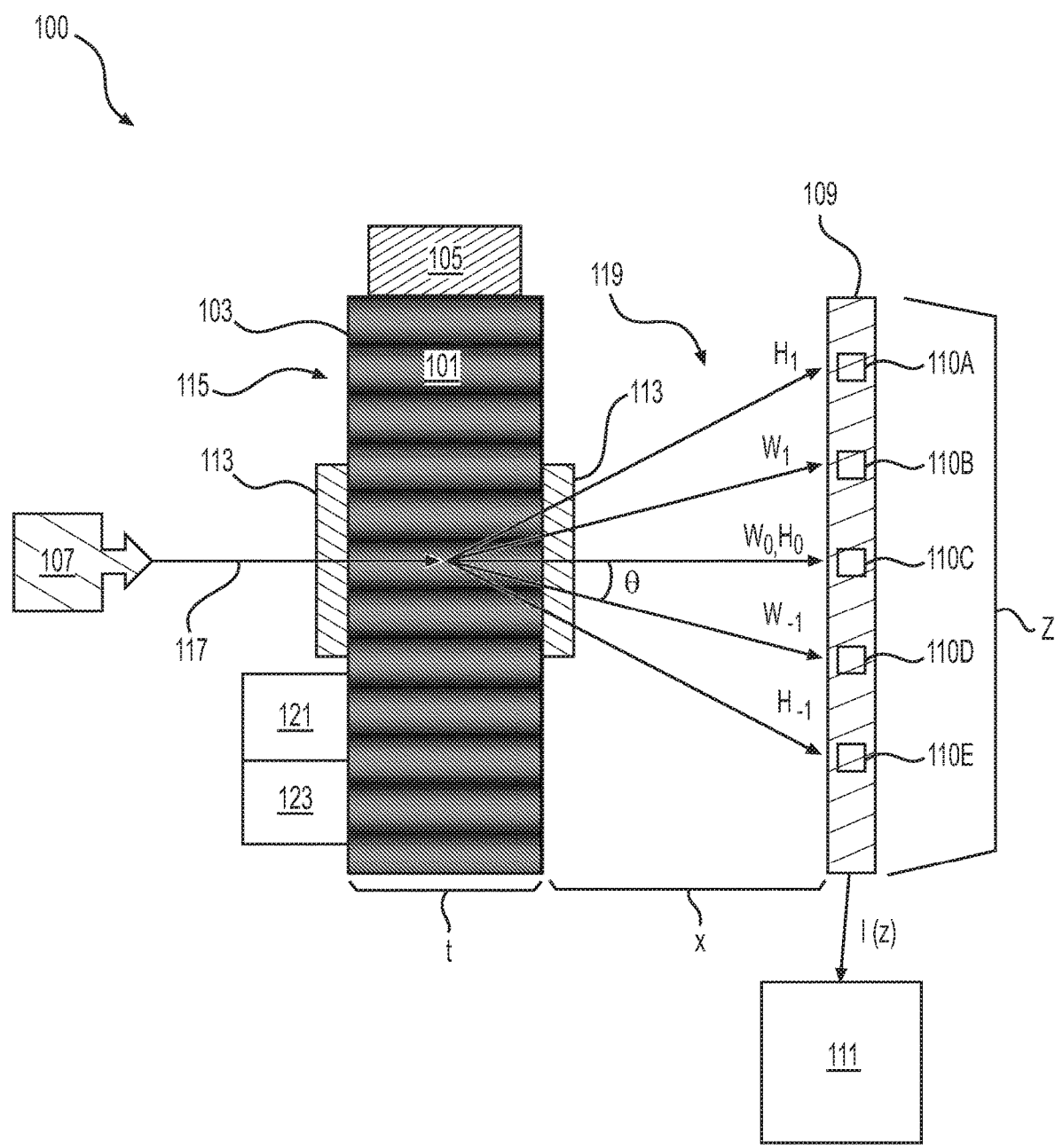
FIG. 1 shows a schematic view of a device to determine a volume concentration of a fluid in a sample, according to one or more embodiments.

FIG. 1 shows a schematic view of a device 100 employed to determine a volume concentration of a fluid (e.g., water) in a sample 101, according to one or more embodiments. As shown, the device 100 includes a chamber 103, a transducer 105, a transmitter 107, a detector 109, and a processor 111. The chamber 103 is filled with the sample 101 to examine the sample 101 for the volume concentrations of its constituents, such as water, with EM radiation. The chamber 103 can be transparent to EM radiation or at least have windows 113 that are transparent to EM radiation. It will be appreciated that the thickness t of the chamber 103 can be selected to produce diffraction beams that are detectable by the detector 109 as further described herein. The sample 101 can be a fluid collected or produced from a wellbore intersecting an earth formation, such as a hydrocarbon fluid with water content. However, it should be appreciated that the sample 101 can be any suitable fluid for examining the volume concentration of its constituents.

The transducer 105 generates a standing acoustic wave 115 in the sample 101. This standing wave 115 modulates the index of refraction and the absorption properties of the sample 101 by generating regions of contrasting densities between the nodes and anti-nodes of the standing wave 115. With the standing wave 115, the sample 101 behaves like a diffraction grating that diffracts incident EM radiation propagating through the sample 101 as further described herein. The transducer 105 can include any suitable device, such as a piezoelectric material, an electromagnetic acoustic transducer (EMAT), or the like.

The transmitter 107 emits EM radiation 117 in a frequency band between about 300 gigahertz and about 10 terahertz into the sample 101. The EM radiation 117 may be monochromatic and emitted across the standing wave 115 in the sample 101 to produce multiple orders of diffracted radiation beams as further described herein. The transmitter 107 may radiate the EM radiation 117 across multiple wavelengths of the standing wave 115. The transmitter 107 can emit pulses of EM radiation 117 or a continuous wave of EM radiation 117. The transmitter 107 may include any suitable device to generate the frequencies of interest, such as a magnetron, high electron mobility transistors, Stark ladders, varactors, varistors, Schottky and Gunn diode chains, beat-frequency-down-converted dual lasers (optical photomixing), vertical cavity surface emitting lasers, quantum cascade diode lasers, free electron lasers, and the like.

The detector 109 is responsive to EM radiation and generates a signal indicative of a wavelength of the standing wave 115. The detector 109 may include an array of separated receivers (110A-E) responsive to EM radiation along the length z of the detector 109. It should be appreciated that the distance x between the sample 101 and the detector 109 can be selected to adjust the angular resolution of the detector 109 to the diffraction angles of the beams 119. The signal generated by the detector may be the relative intensity of EM radiation incident to the detector as a function of length z along the detector 109, i.e., I(z). Peaks (e.g., local maxima) within the signal (e.g., I(z)) may indicate the position of the diffracted beams 119 arriving along the detector 109. The processor 111 analyzes the signal to determine the intensity of each diffracted beam 119 and its position along the detector 109, which can be used to determine wavelength of the standing wave 115.

With the diffraction angles associated with the intensity peaks, the wavelength of the standing wave 115 in the sample 101 can be determined based on diffraction principles, such as the Fraunhofer diffraction principle. If the sample 101 is assumed to diffract EM radiation like a diffraction grating with multiple slits and the incident EM radiation 117 is normal to this diffraction grating, the relationship between the diffraction angle and the wavelength of the standing wave 115 is given by:

$$m \cdot \lambda_{EM} = d \cdot \sin \theta \quad (1),$$

where m is the order number of the diffracted beam (e.g., m=−3, −2, −1, 0, 1, 2, 3, . . . ), $\lambda_{EM}$ is the wavelength of the diffracted beam (e.g., $H_1$), d is the distance between slits in the diffraction grating, and θ is the diffraction angle of the diffracted beam with respect to normal of the diffraction grating. The distance d can be assumed to represent half the wavelength of an acoustic wave corresponding to the standing wave 115 in the sample 101. As used herein, the acoustic wave corresponding to the standing wave refers to an acoustic wave that can form the standing wave, such as one of the acoustic wave components of the standing wave propagating in opposing directions. As illustrated, the diffracted beams 119 include $H_0$ and $H_1$ which correspond to zero order and the first order diffracted beams, respectively. For example, the wavelength of the acoustic wave corresponding to the standing wave 115 can be determined where m=−1, $\lambda_{em}$ is the wavelength of the emitted EM radiation 117, d is half the wavelength of the acoustic wave, and θ is the diffraction angle of the diffracted beam $W_{-1}$.

From this wavelength, the velocity of the acoustic wave corresponding to the standing wave 115 is given by:

$$v_{sample} = f_{sw} \lambda_{sw} \quad (2),$$

where $v_{sample}$ is the velocity of the acoustic wave corresponding to the standing wave 115 in the sample, $f_{sw}$ is the frequency of the acoustic wave corresponding to the standing wave 115 in the sample 101 as applied by the transducer 105, and $\lambda_{sw}$ is the wavelength of the acoustic wave corresponding to the standing wave 115 in the sample 101.

The velocity of an acoustic wave in the sample 101, the wavelength of the acoustic wave in the sample 101, and the diffracted beam pattern produced by the standing acoustic wave 115 depend in part on the density of the sample 101. To determine the density of the sample 101, diffracted beam patterns may be calibrated for samples with various densities based on a given frequency applied to those samples. The velocity of the acoustic wave corresponding to the standing wave 115 is used to determine the concentration of a fluid in the sample 101 by applying principles of compressibility or other suitable relationships associated with density and acoustic velocity. For example, from the acoustic wave velocity in the sample, a Bulk modulus of the sample 101 and its density ρ can be determined based on the Newton-Laplace formula given by:

$$v_{sample} = \sqrt{\frac{K}{\rho}}, \quad (3)$$

where K is the Bulk modulus of the sample 101 and ρ is the density of the sample 101. A weight function can be applied to the Bulk modulus K and/or the density ρ to determine the concentration of a fluid, such as water, in the sample 101, for example, using the relationship given by the Newton-Laplace formula.

In one or more embodiments, the device 100 may include a temperature sensor 121 and/or a pressure sensor 123 to measure the temperature and pressure of the sample 101, respectively. The measured temperature and/or pressure may be used to determine the Bulk modulus K and/or the density ρ of the sample 101.

Multiple acoustic waves in the sample 101 may propagate at different velocities for the acoustic frequency applied to the sample 101, resulting in different wavelengths produced in the sample 101. Thus, different acoustic wave velocities can be excited in the sample 101 for the acoustic frequency applied to the sample 101. These acoustic wave velocities are measurable based on the peaks identified in the signal produced by the detector 109. The processor 111 is also configured to analyze the signal to determine constituents in the sample 101 based on the relative intensity of peaks identified in the signal produced by the detector 109. The peaks in the signal may correspond to diffraction orders of the constituents in the sample (e.g., $H_1$ and $W_1$ may represent the first order diffraction beams of a hydrocarbon fluid and a water-based fluid, respectively). The relative amplitudes of the peaks of $H_1$ and $W_1$ may correspond to the concentration of each of these fluids. A weight function can be applied to the intensities of the zero order diffracted beam (e.g., $W_0$, $H_0$) to determine the relative concentration of the constituents in the sample 101. It should be appreciated that determining the concentration of water in the sample 101 can be used to determine the water cut for applications involving hydrocarbon production or any other suitable application.

The control and processing of the signal generated by the detector 109 is performed with the use of a computer program on a suitable non-transitory machine readable storage medium, which may include ROM, EPROM, EEPROM, flash memory, a hard disk, a solid state disk, an optical disk, or a combination thereof. As used herein, the term processor is intended to include devices such as a field programmable gate array (FPGA). The results of the processing may be output to a suitable medium and/or may be used for determining producible zones in a subterranean earth formation along a wellbore as further described herein.

Figure 2:
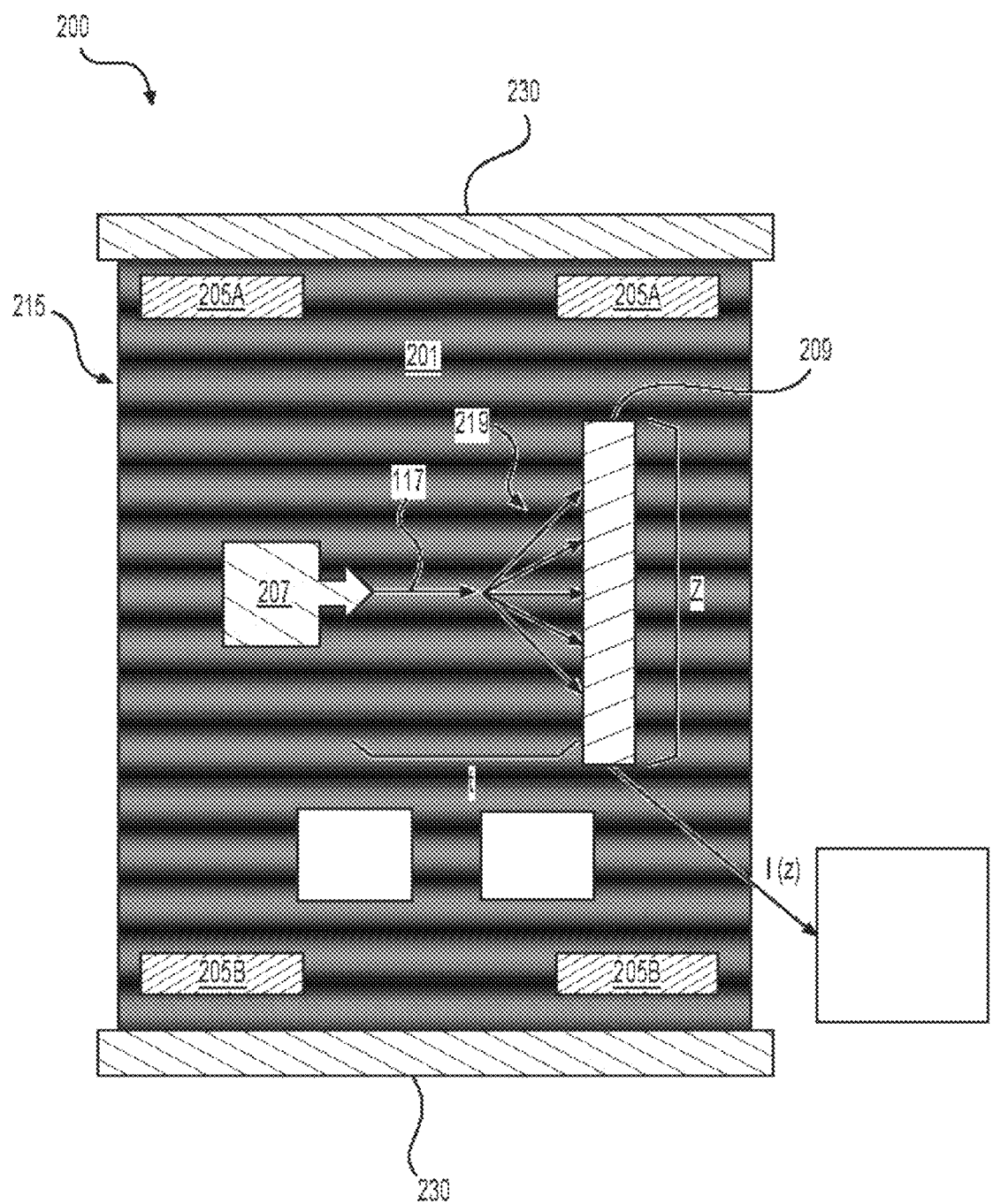
FIG. 2 shows a schematic view of another device to determine the volume concentration of a fluid in a sample, according to one or more embodiments.

FIG. 2 shows a schematic view of a device 200 employed to determine a volume concentration of a fluid in a sample 201, according to one or more embodiments. As shown, the transducers 205A and 205B, transmitter 207, and detector 209 are locatable in the sample 201. For example, the transducers 205, transmitter 207, and detector 209 may be located in a tubular 230 that transports the sample 201, such as a production string involved in hydrocarbon production. The transducers 205A may be spaced apart from the transducers 205B so that the transducers 205A and 205B cooperate to generate the standing acoustic wave 215. For example, the transducers 205A generate an acoustic wave that travels towards the transducers 205B, while the transducers 205B generate the standing wave counterpart that travels towards the transducers 205A. The detector 209 is responsive to the diffracted beams 219 and generates a signal indicative of a wavelength of an acoustic wave corresponding to the standing wave 215, which is analyzed to determine the volume concentration of a fluid in the sample 201.

Figure 3:
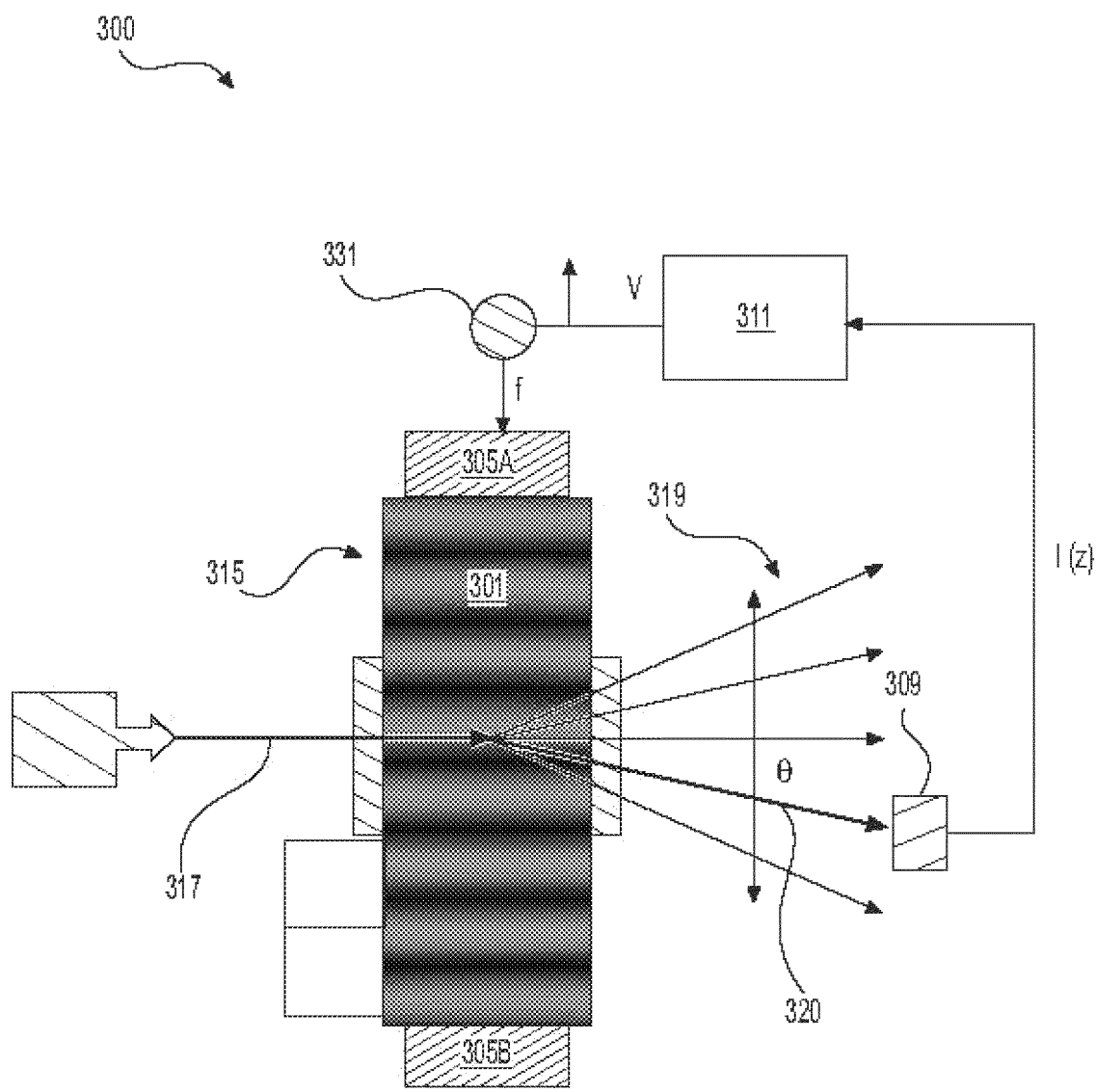
FIG. 3 shows a schematic view of another device to determine the volume concentration of a fluid in a sample, according to one or more embodiments.

FIG. 3 shows a schematic view of a device 300 employed to determine a volume concentration of a fluid in a sample 301, according to one or more embodiments. As shown, the detector 309 is positioned to be responsive to a diffracted beam 320 emerging from the sample 301 at a diffraction angle θ with respect to normal of the diffraction grating. The processor 311 can control an adjustable oscillator 331 (e.g., a voltage-controlled oscillator) to apply a frequency sweep to the transducers 305A and 305B. Further, the transducers 305A and 305B sweep a band of frequencies to generate standing acoustic waves 315 that diffract the incident EM radiation 317 at various diffraction angles (e.g., a diffraction angle θ). The detector 309 is responsive to the diffracted beams 319 at the diffraction angle θ and generates a signal indicative of the wavelength of an acoustic wave corresponding to the standing acoustic wave 315 in the sample 101, which in turn, can be used to determine the volume concentration of a fluid in the sample 301 as described herein. Thus, the device 300 allows for determination of the volume concentration of a fluid in the sample 301 with the detector 309 that resolves the diffracted beam 320 intensity at a single diffraction angle.

Figure 4:
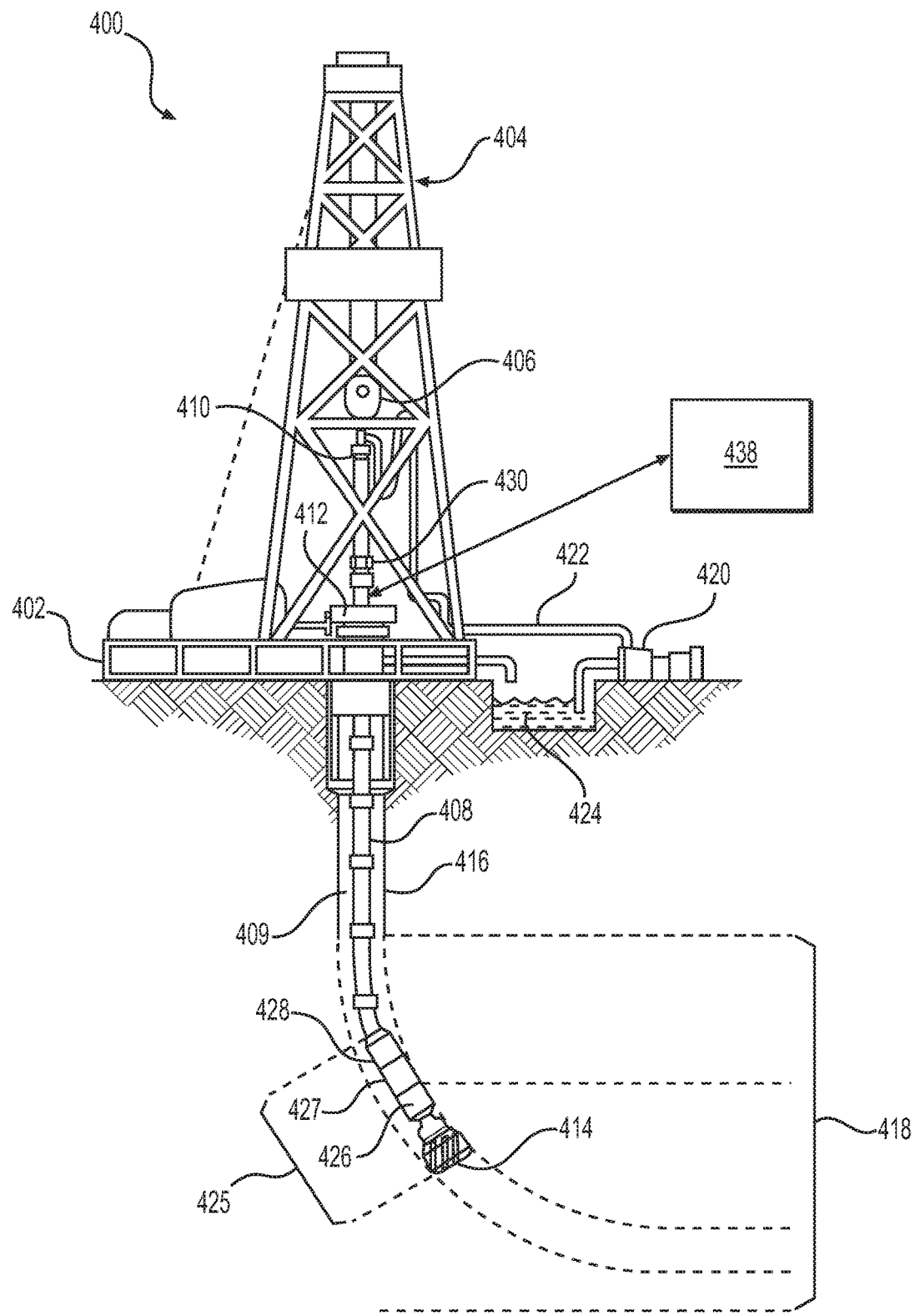
FIG. 4 shows a schematic view of a drilling environment, according to one or more embodiments.

FIG. 4 shows a schematic view a drilling operation employing a system 400 to determine the water cut along a wellbore 416, according to one or more embodiments. As shown, a drilling platform 402 supports a derrick 404 having a traveling block 406 for raising and lowering a drill string 408. A drill string kelly 410 supports the rest of the drill string 408 as it is lowered through a rotary table 412. The rotary table 412 rotates the drill string 408, thereby turning a drill bit 414. As the drill bit 414 rotates, it creates a wellbore 416 that passes through various subterranean earth formations 418. A pump 420 circulates drilling fluid through a feed pipe 422 to the kelly 410, downhole through the interior of the drill string 408, through orifices in the drill bit 414, back to the surface via an annulus 409 around the drill string 408, and into a retention pit 424. The drilling fluid transports cuttings from the wellbore 416 into the pit 424 and aids in maintaining the integrity of the wellbore 416.

A bottomhole assembly 425 is connected along the drill string 408 and includes drill collars 426, a downhole tool 427, and the drill bit 414. The drill collars 426 are thick-walled steel pipe sections that provide weight and rigidity for the drilling process. The downhole tool 427 (which may be built into one of the drill collars) may collect measurements relating to various wellbore and formation properties as well as the position of the bit 414 and various other drilling conditions as the bit 414 extends the wellbore 416 through the formations 418. For example, the downhole tool 427 includes a device 428 to determine the volume concentration of a fluid (such as water or hydrocarbons) in a sample, such as the drilling fluid or formation fluid, in accordance with one or more embodiments. For example, the device 428 can determine the water cut as a function of depth within the wellbore 416. From this, producible zones of hydrocarbons can be identified along the wellbore 416.

In one or more embodiments, the downhole tool 427 may include a device for measuring formation resistivity, a gamma ray device for measuring formation gamma ray intensity, devices for measuring the inclination and azimuth of the tool string 408, pressure sensors for measuring drilling fluid pressure, temperature sensors for measuring wellbore temperature, etc. The downhole tool 427 may also include a telemetry module that receives data provided by the various sensors of the bottomhole assembly 425 (e.g., the device 428), and transmits the data to a surface control unit 438. Data may also be provided by the surface control unit 438, received by the telemetry module, and transmitted to the sensors (e.g., the device 428) of the bottomhole assembly 425.

Figure 5:
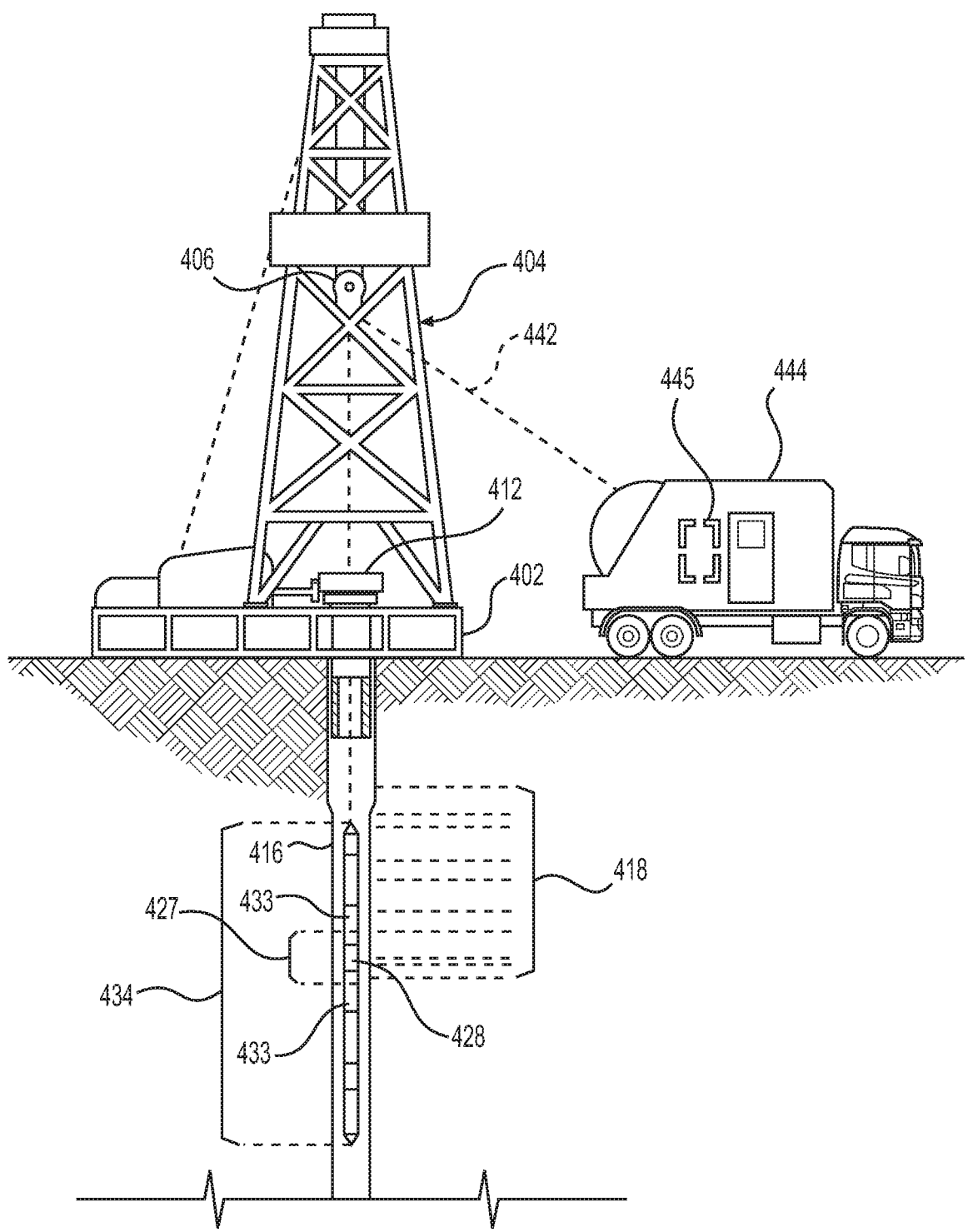
FIG. 5 shows a schematic view of a wireline logging environment, according to one or more embodiments.

FIG. 5 shows a schematic view of a wireline logging environment in which the device 428, in accordance with one or more embodiments described in the present disclosure, may be used. As shown, logging operations can be conducted using a wireline logging string 434, e.g., a wireline logging sonde, suspended by a cable 442 that communicates power to the logging string 434 and telemetry signals between the logging string 434 and the surface. The logging string 434 includes the downhole tool 427, which can determine the water cut as a function of depth within the wellbore 416 as described herein. For example, the downhole tool 427 includes the device 428 to determine the volume concentration of a fluid (e.g., water and/or hydrocarbons) in a sample (e.g., the drilling fluid or a fluid sampled from the formation) in accordance with one or more embodiments.

The downhole tool 427 may be coupled to other modules of the wireline logging string 434 by one or more adaptors 433. A logging facility 444 collects measurements from the logging string 434, and includes a computer system 445 for processing and storing the measurements gathered by the sensors. Among other things, the computer system 445 may include a non-transitory computer-readable medium (e.g., a hard-disk drive and/or memory) capable of executing instructions to perform such tasks. In addition to collecting and processing measurements, the computer system 445 may be capable of controlling the logging string 434 and downhole tool 427. The logging facility 444 may further include a user interface (not shown) which displays the measurements, for example, a monitor or printer. Thus, it should be appreciated that the device 428 may be used, in accordance with one or more embodiments, in various applications, such as wireline, slickline, coiled tubing, measurement-while-drilling, logging-while-drilling, production tubing, flowline, process chemistry, hydrocarbon processing, hydrocarbon separation, etc.

In addition to the embodiments described above, many examples of specific combinations are within the scope of the disclosure, some of which are detailed below:

Example 1

A device for determining a volume concentration of a fluid in a sample, comprising:
 a transducer configured to generate a standing acoustic wave through the sample;
 a transmitter configured to emit electromagnetic (EM) radiation into the sample such that the EM radiation is diffracted by the sample;
 a detector responsive to the diffracted EM radiation and configured to generate a signal indicative of a wavelength of an acoustic wave corresponding to the standing acoustic wave; and a processor configured to analyze the signal to determine
the volume concentration of the fluid in the sample.

Example 2

The device of example 1, wherein the processor is further configured to determine the volume concentration using a velocity of the standing acoustic wave and at least one of a Bulk modulus of the sample and a density of the sample.

Example 3

The device of example 2, wherein the processor is further configured to determine a velocity of the acoustic wave corresponding to the standing acoustic wave in the sample using the signal to determine the wavelength of the acoustic wave.

Example 4

The device of example 2, further comprising:
a temperature sensor configured to measure a temperature of the sample; and
a pressure sensor configured to measure pressure of the sample; and
wherein the processer is further configured to determine at least one of the Bulk modulus and the density using at least one of the measured pressure and temperature.

Example 5

The device of example 1, further comprising a chamber configured to hold the sample.

Example 6

The device of example 1, further comprising:
an additional transducer spaced from the transducer; and
wherein the transducer is configured to generate an acoustic wave through the sample in a first direction; and
wherein the additional transducer is configured to generate an opposing acoustic wave through the sample in a second direction opposite the first direction such that the acoustic wave and the opposing wave form the standing acoustic wave.

Example 7

The device of example 1, wherein:
the detector is positioned to be responsive to the diffracted EM radiation at a diffraction angle with respect to the emitted EM radiation; and
the transducer is further configured to sweep additional standing acoustic waves through the sample across a band of frequencies.

Example 8

The device of example 1, wherein the processor is further configured to determine the volume concentration based on intensity peaks identified in the signal.

Example 9

The device of example 2, wherein the transducer, transmitter, and detector are locatable in a wellbore intersecting an earth formation.

Example 10

The device of example 1, wherein the EM radiation is in a frequency band between about 300 gigahertz and about 10 terahertz.

Example 11

A method of determining a volume concentration of a fluid in a sample, comprising:
generating a standing acoustic wave through the sample using a transducer;
emitting electromagnetic (EM) radiation into the sample using a transmitter such that the EM radiation is diffracted by the sample;
receiving the diffracted EM radiation with a detector;
generating a signal indicative of a wavelength of an acoustic wave corresponding to the standing acoustic wave in response to receiving the diffracted EM radiation using the detector; and
analyzing the signal to determine the volume concentration of the fluid in the sample.

Example 12

The method of example 11, further comprising determining the volume concentration using a velocity of the acoustic wave corresponding to the standing acoustic wave in the sample and at least one of a Bulk modulus of the sample and a density of the sample.

Example 13

The method of example 12, wherein analyzing the signal comprises determining the velocity of the acoustic wave corresponding to the standing acoustic wave in the sample using the signal to determine a wavelength of the standing acoustic wave.

Example 14

The method of example 12, further comprising:
measuring a temperature of the sample;
measuring a pressure of the sample;
determining at least one of the Bulk modulus and the density using at least one of the pressure and temperature.

Example 15

The method of example 11, further comprising:
positioning a detector responsive to the diffracted EM radiation at a diffraction angle with respect to the emitted EM radiation;
generating additional standing acoustic waves in the sample across a band of frequencies.

Example 16

The method of example 11, further comprising determining the volume concentration based on intensity peaks identified in the signal.

Example 17

The method of example 11, further comprising holding the sample in a chamber.

Example 18

A system for determining a volume concentration of a fluid in a sample, comprising:
- a downhole tool locatable in a wellbore intersecting a subterranean earth formation, comprising:
  - a transducer configured to generate a standing acoustic wave through the sample;
  - a transmitter configured to emit electromagnetic (EM) radiation into the sample such that the EM radiation is diffracted by the sample; and
  - a detector responsive to the diffracted EM radiation and configured to generate a signal indicative of a wavelength of an acoustic wave corresponding to the standing acoustic wave; and
- a processor configured to analyze the signal to determine the volume concentration of the fluid in the sample.

Example 19

The system of example 18, wherein the processor is further configured to determine the volume concentration using a velocity of the acoustic wave corresponding to the standing acoustic wave in the sample and at least one of a Bulk modulus of the sample and a density of the sample.

Example 20

The system of example 19, wherein the processor is further configured to determine the velocity of the acoustic wave corresponding to the standing acoustic wave in the sample using the signal to determine the wavelength of the acoustic wave.

This discussion is directed to various embodiments. The drawing figures are not necessarily to scale. Certain features of the embodiments may be shown exaggerated in scale or in somewhat schematic form and some details of conventional elements may not be shown in the interest of clarity and conciseness. Although one or more of these embodiments may be preferred, the embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to suggest that the scope of the disclosure, including the claims, is limited to that embodiment.

Certain terms are used throughout the description and claims to refer to particular features or components. As one skilled in the art will appreciate, different persons may refer to the same feature or component by different names. This document does not intend to distinguish between components or features that differ in name but not function, unless specifically stated. In the discussion and in the claims, the terms "including" and "comprising" are used in an open-ended fashion, and thus should be interpreted to mean "including, but not limited to . . . ." Also, the term "couple" or "couples" is intended to mean either an indirect or direct connection. In addition, the terms "axial" and "axially" generally mean along or parallel to a central axis (e.g., central axis of a body or a port), while the terms "radial" and "radially" generally mean perpendicular to the central axis. The use of "top," "bottom," "above," "below," and variations of these terms is made for convenience, but does not require any particular orientation of the components.

Reference throughout this specification to "one embodiment," "an embodiment," or similar language means that a particular feature, structure, or characteristic described in connection with the embodiment may be included in at least one embodiment of the present disclosure. Thus, appearances of the phrases "in one embodiment," "in an embodiment," and similar language throughout this specification may, but do not necessarily, all refer to the same embodiment.

Although the present disclosure has been described with respect to specific details, it is not intended that such details should be regarded as limitations on the scope of the disclosure, except to the extent that they are included in the accompanying claims.

What is claimed is:

1. A device for determining a volume concentration of a fluid in a sample, comprising:
   - a transducer configured to generate a standing acoustic wave through the sample;
   - a transmitter configured to emit electromagnetic (EM) radiation into the sample such that the EM radiation is diffracted by the sample;
   - a detector responsive to the diffracted EM radiation and configured to generate a signal indicative of a wavelength of an acoustic wave corresponding to the standing acoustic wave; and
   - a processor configured to analyze the signal to determine the volume concentration of the fluid in the sample using a velocity of the standing acoustic wave and at least one of a Bulk modulus of the sample and a density of the sample.

2. The device of claim 1, wherein the processor is further configured to determine a velocity of the acoustic wave corresponding to the standing acoustic wave in the sample using the signal to determine the wavelength of the acoustic wave.

3. The device of claim 1, further comprising:
   - a temperature sensor configured to measure a temperature of the sample; and
   - a pressure sensor configured to measure pressure of the sample; and
   - wherein the processer is further configured to determine at least one of the Bulk modulus and the density using at least one of the measured pressure and temperature.

4. The device of claim 1, further comprising a chamber configured to hold the sample.

5. The device of claim 1, further comprising:
   - an additional transducer spaced from the transducer; and
   - wherein the transducer is configured to generate an acoustic wave through the sample in a first direction; and
   - wherein the additional transducer is configured to generate an opposing acoustic wave through the sample in a second direction opposite the first direction such that the acoustic wave and the opposing wave form the standing acoustic wave.

6. The device of claim 1, wherein:
   - the detector is positioned to be responsive to the diffracted EM radiation at a diffraction angle with respect to the emitted EM radiation; and
   - the transducer is further configured to sweep additional standing acoustic waves through the sample across a band of frequencies.

7. The device of claim 1, wherein the processor is further configured to determine the volume concentration based on intensity peaks identified in the signal.

8. The device of claim 1, wherein the transducer, transmitter, and detector are positionable in a wellbore intersecting an earth formation.

9. The device of claim 1, wherein the EM radiation is in a frequency band between 300 gigahertz and about 10 terahertz.

10. A method of determining a volume concentration of a fluid in a sample, comprising:
generating a standing acoustic wave through the sample using a transducer;
emitting electromagnetic (EM) radiation into the sample using a transmitter such that the EM radiation is diffracted by the sample;
receiving the diffracted EM radiation with a detector;
generating a signal indicative of a wavelength of an acoustic wave corresponding to the standing acoustic wave in response to receiving the diffracted EM radiation using the detector; and
analyzing the signal to determine the volume concentration of the fluid in the sample using a velocity of the acoustic wave corresponding to the standing acoustic wave in the sample and at least one of a Bulk modulus of the sample and a density of the sample.

11. The method of claim 10, wherein analyzing the signal comprises determining the velocity of the acoustic wave corresponding to the standing acoustic wave in the sample using the signal to determine a wavelength of the standing acoustic wave.

12. The method of claim 10, further comprising:
measuring a temperature of the sample;
measuring a pressure of the sample;
determining at least one of the Bulk modulus and the density using at least one of the pressure and temperature.

13. The method of claim 10, further comprising:
positioning a detector responsive to the diffracted EM radiation at a diffraction angle with respect to the emitted EM radiation;
generating additional standing acoustic waves in the sample across a band of frequencies.

14. The method of claim 10, further comprising determining the volume concentration based on intensity peaks identified in the signal.

15. The method of claim 10, further comprising holding the sample in a chamber.

16. A system for determining a volume concentration of a fluid in a sample, comprising:
a downhole tool positionable in a wellbore intersecting a subterranean earth formation, comprising:
a transducer configured to generate a standing acoustic wave through the sample;
a transmitter configured to emit electromagnetic (EM) radiation into the sample such that the EM radiation is diffracted by the sample; and
a detector responsive to the diffracted EM radiation and configured to generate a signal indicative of a wavelength of an acoustic wave corresponding to the standing acoustic wave; and
a processor configured to analyze the signal to determine the volume concentration of the fluid in the sample using a velocity of the acoustic wave corresponding to the standing acoustic wave in the sample and at least one of a Bulk modulus of the sample and a density of the sample.

17. The system of claim 16, wherein the processor is further configured to determine the velocity of the acoustic wave corresponding to the standing acoustic wave in the sample using the signal to determine the wavelength of the acoustic wave.

* * * * *